United States Patent [19]

Dufresne

[11] Patent Number: 4,664,624

[45] Date of Patent: May 12, 1987

[54] METAL MELTING INSTALLATION

[76] Inventor: Jacques Dufresne, 6889 Lamont Ave., Montreal, Quebec, Canada, H4E 2T8

[21] Appl. No.: 852,015

[22] Filed: Apr. 14, 1986

[30] Foreign Application Priority Data

Dec. 12, 1985 [CA] Canada .................................. 497508

[51] Int. Cl.⁴ ......................... F27D 19/00; F16F 15/00

[52] U.S. Cl. ....................................... 432/56; 432/253; 432/243; 74/574

[58] Field of Search ............... 432/156, 159, 242, 243, 432/250, 253, 5, 56; 74/574; 192/106.1

[56] References Cited

U.S. PATENT DOCUMENTS

| | | | |
|---|---|---|---|
| 1,557,208 | 10/1925 | Lee et al. | 432/56 |
| 1,895,072 | 1/1933 | Fenton et al. | 432/243 |
| 3,128,640 | 4/1964 | Ziedler | 192/106.1 |
| 3,514,974 | 6/1970 | Adachi | 64/27 |
| 3,528,265 | 9/1970 | Brinson | 64/26 |
| 3,638,927 | 2/1972 | Wells | 432/56 |
| 3,730,013 | 5/1973 | Slemmons | 74/574 |
| 4,129,090 | 12/1978 | Inaniwa et al. | 432/253 |
| 4,160,390 | 7/1979 | Spaetgens | 74/574 |
| 4,210,234 | 7/1980 | Jones | 192/106.1 |
| 4,313,577 | 2/1982 | Peters | 74/574 |
| 4,579,523 | 4/1986 | Laiquddin et al. | 432/253 |

*Primary Examiner*—Henry C. Yuen

*Attorney, Agent, or Firm*—Robic, Robic & Associates

[57] ABSTRACT

A metal melting installation in which a movable carrier has a kiln door fixed at its front end for closing an entrance opening of the kiln and a crucible provided forwardly of the door so as to lodge in the kiln when the entrance opening is closed. A drive means for closing the carrier comprises: an electric motor in a control circuit that also includes a limit switch mounted adjacent the kiln entrance opening; a chain and sprocket gear for moving the carrier; a damper device interconnecting the drive shaft of the motor and one sprocket wheel of the gear for allowing it to keep on rotating to dissipate accumulated momentum energy when the motor is de-energized, a push button being provided on the carrier for contacting the limit switch to thus cut off the electric circuit and deenergize the motor when the door on the carrier closes the kiln opening.

5 Claims, 5 Drawing Figures

METAL MELTING INSTALLATION

FIELD OF THE INVENTION

The present invention relates to an improved metal melting installation.

DESCRIPTION OF THE RELATED ART

In a particular type of metal melting installation as referred to above, a crucible holding carrier is moved toward the kiln to insert the crucible, filled with metal to be melted, into the kiln through the kiln entrance opening, the carrier further having a kiln door which closes the entrance opening after the crucible is lodged in the kiln. As soon as the door is closed, a limit switch is activated to cut off the drive motor control circuit thereby stopping the drive motor. It will be appreciated that the load being displaced by the drive motor is relatively heavy and that the moving carrier, with its loaded crucible, develops a momentum which is quite high by the time the door reaches and finally closes the kiln entrance opening. Now, the severe conditions of temperature and dust under which the installation operates often cause malfunctioning of the motor drive control system and more particularly the limit switch, sometimes resulting in delayed cut-off of the motor that occurs after the entrance opening is closed by the kiln door and after the carrier is no longer able to move. It will be appreciated that the stress applied to the system driving the carrier is then considerable. In the particular case where the drive system involves a chain and sprocket drive, one or both of the chains or even the sprocket wheel often break.

It is therefore an object of the present invention to provide an improved installation of the above type capable of avoiding the noted deficiency.

SUMMARY OF THE INVENTION

Accordingly, there is provided a metal melting installation in which a movable carrier has a kiln door fixed at its front end for closing an entrance opening of the kiln and a crucible provided forwardly of the door so as to lodge in the kiln when the entrance opening is closed. The carrier is moved by a drive means which comprises: an electric motor means in a control circuit that also includes a limit switch mounted adjacent the kiln entrance opening; chain and sprocket means for moving the carrier; damper means interconnecting the drive shaft of the motor means and one of the sprocket wheels of the chain and sprocket means for allowing the said one sprocket wheel to keep on rotating to dissipate accumulated energy when the motor means are de-energized, means being further provided on the carrier for contacting the limit switch to cut off the electric circuit and thus deenergize the motor when the door on the carrier closes the kiln opening.

PRIOR ART REFERENCES

The following U.S. patents were found during a prior art search:

U.S. Pat. No. 3,128,640—1964
U.S. Pat. No. 3,479,906—1969
U.S. Pat. No. 3,514,974—1970
U.S. Pat. No. 3,528,265—1970
U.S. Pat. No. 4,160,390—1979
U.S. Pat. No. 4,210,234—1980

All of the above patents are restricted to various types of dampening devices and none is concerned with the problem discussed above as regard to a metal melting installation. The present invention relates to a construction which does use a damper device of a particularly advantageous type but only as a component among other several components.

BRIEF DESCRIPTION OF THE DRAWING

A description now follows of a preferred embodiment of the invention having reference to the appended drawing wherein.

DESCRIPTION OF THE PREFERRED EMBODIMENT

Figure 1:
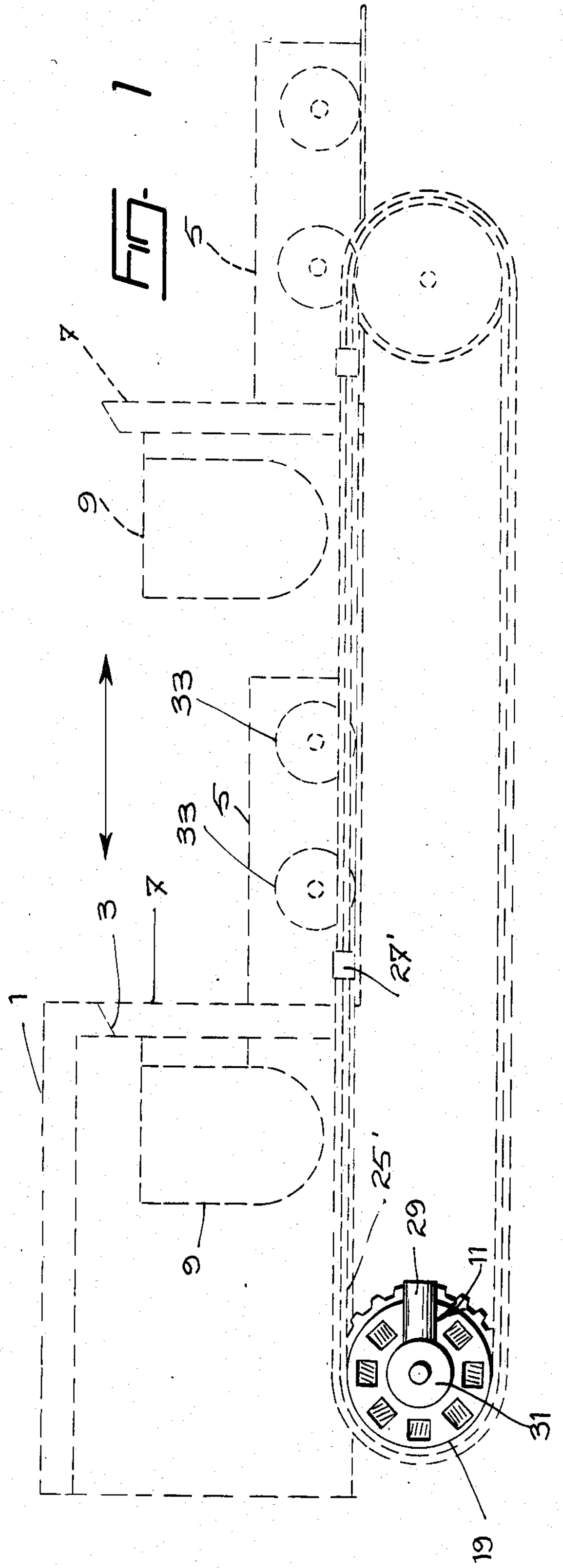
FIG. 1 is a diagrammatic side elevation view of an installation made according to the invention.
Figure 2:
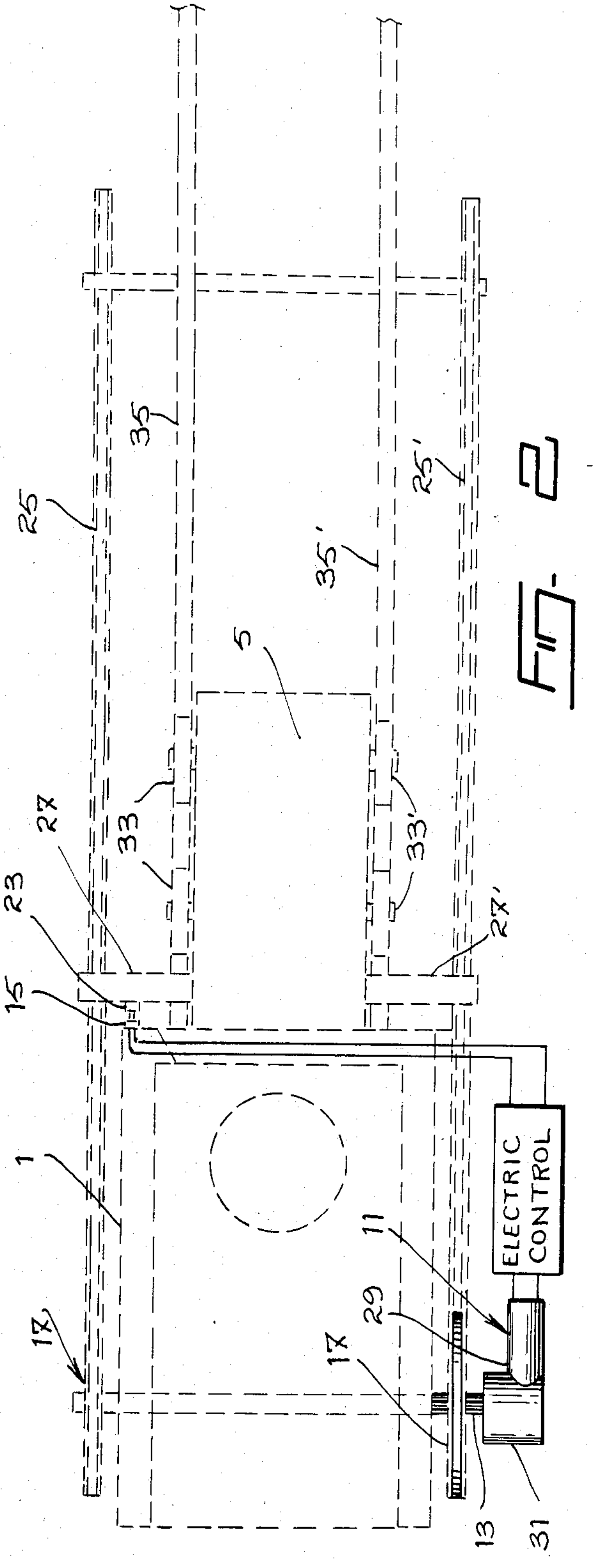
FIG. 2 is a top plan view of the installation of FIG. 1.

The whole installation is shown diagrammatically in FIGS. 1 and 2 and it will be seen to comprise a melting kiln 1 formed with a crucible entrance opening 3, a movable carrier 5; a kiln door 7 fixed to the front end of the carrier in any known manner such as by welding, the door 7 having an outer bevelled contour suitable for application on the bevel contour of the entrance opening 3 so that, as shown in FIG. 1, the door 7 may be moved from the right hand position of the carrier away from the kiln 1 to the left hand position where the door 7 is applied over the entrance opening 3 and closes the kiln 1. A crucible 9 is fixed to the door 7, in any known manner, forwardly of the door 7 so that, as best shown in the left hand view of FIG. 1, the crucible 9 lodges fully in the kiln 1 when the door 7 closes the entrance opening 3.

Suitable drive means, now to be described, move the carrier 5 for applying the door 7 over the entrance opening 3.

In this respect, there is provided an electric control circuit which includes electric motor means 11 having a drive shaft 13, the circuit further including a limit switch 15 suitable to cut off the circuit when contacted. This limit switch 15 is mounted on the kiln 1 adjacent the entrance opening 3. Chain and sprocket means 17 are connected to the carrier 5 for moving it in the aforesaid manner, the latter means including a drive sprocket wheel 19 more particularly shown in FIGS. 3 to 5. Damper means, in the form of springs 21, interconnect the drive shaft 13 and the drive sprocket wheel 19 for allowing the sprocket wheel 19 to keep on rotating whereby to dissipate accumulated momentum energy when the motor is de-energized, as will hereinafter be more fully explained. Finally, means preferably in the form of a push button 23, is provided on the carrier for contacting the limit switch 15, as shown in FIG. 2, and thereby cut off the circuit for de-energizing the motor of the motor means 11 when the door 7 is fully applied over the entrance opening 3.

The chain and sprocket means 17 aforesaid are shown to comprise a pair of endless movable sprocket chains 25, 25′ extending on either side of the carrier 5 and a pair of arms 27, 27′, each projecting laterally from the carrier 5, being fixed to it as well as being fixed to one of the chains 25, 25' so that the carrier 5 may be driven by the chains 25, 25'. It will be noted that the push button 23 is provided on the arm 27, in facing relationship with the limit switch 15. The relationship is also such that contacting of the limit switch 15 by the push button 23 takes place as soon as the kiln door 7 fits squarely on the kiln entrance opening 3. At that moment, the electric circuit of the drive means is cut off so as to de-energize the motor 29 of the electric motor means 11. The circuit includes of course all standard electric controls that are necessary appropriately to operate the installation such as moving the carrier 5 back and forth with respect to the kiln 1. Similarly, the drive shaft 13 is appropriately connected, if necessary, to the motor 29 through a speed reducer 31.

As to the carrier 5 itself, it is mounted on wheels 33, 33' adapted to move on rails 35, 35' parallel to the endless chains 25, 25'.

Figure 4:
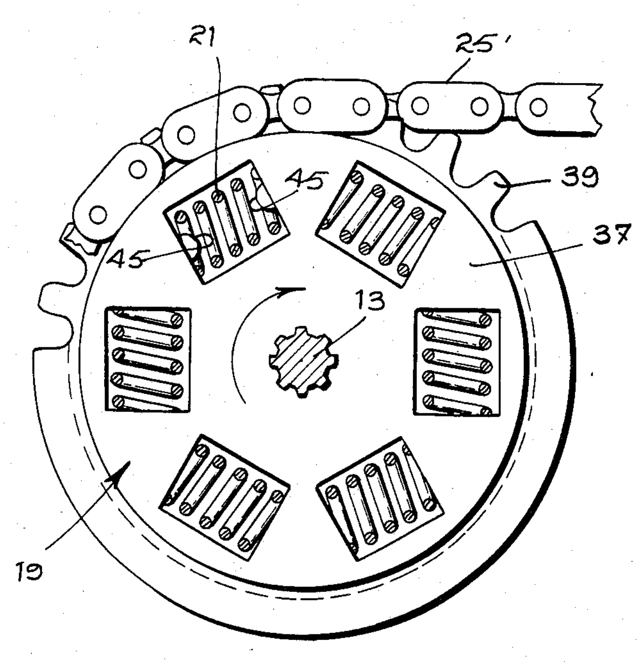
FIG. 4 is a diagrammatic side elevation view of the drive sprocket, damper device and relevant sprocket chain shown in driving operation.
Figure 5:
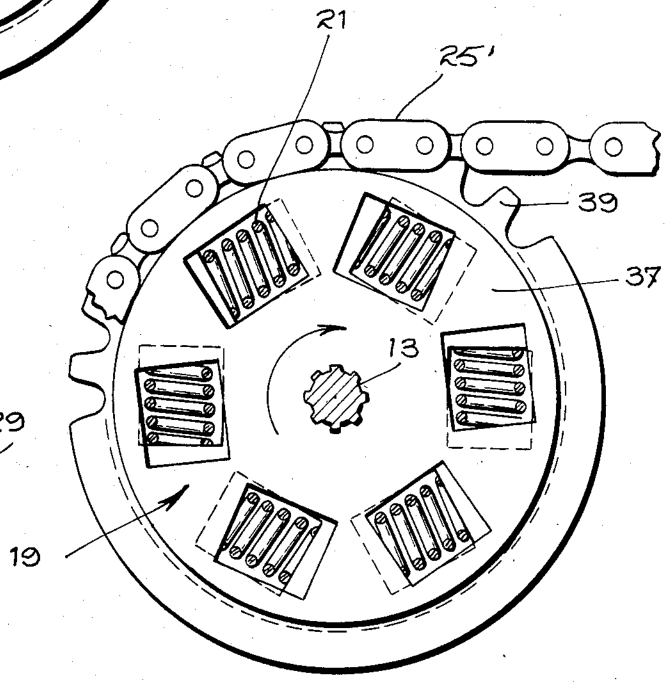
FIG. 5 is a view similar to that of FIG. 4 but showing the driving means after de-energization of the motor.
Figure 3:
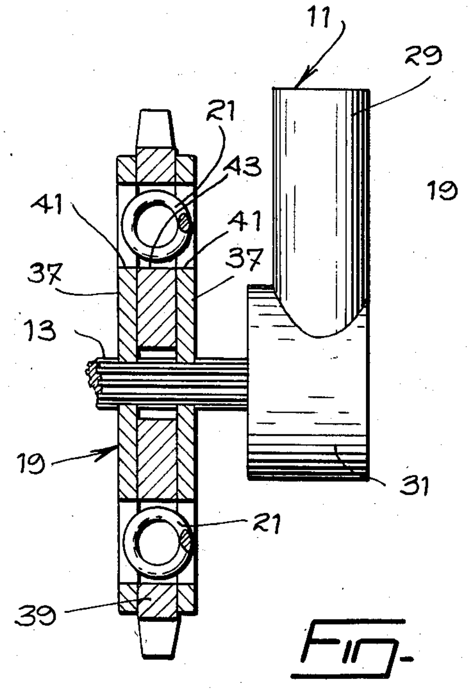
FIG. 3 is a top plan view of the drive portion of the installation with the driving sprocket and damper device shown in cross-section.

As to the drive sprocket wheel 19, clearly illustrated in FIG. 3, it will be seen to comprise a pair of spaced cheeks 37 splined over the drive shaft 13 to be rotated thereby, a sprocket disc 39 freely mounted on the shaft 13 is provided between the two cheeks 37. The disc 39 meshes with the sprocket chain 25' as shown in FIGS. 4 and 5. The cheeks 37 as well as the sprocket disc 39 are formed with generally rectangular registering through apertures 41, in the cheeks 37, and 43, in the sprocket disc 39; these registering apertures all having the same size and being distributed evenly around the shaft 13. In the registering condition of FIG. 4, two apertures 41 of the cheeks 37 fully overlie one another as well as a corresponding aperture 43 of the sprocket disc 39. The damper coil springs 21 lodge in these apertures, being retained therein in any suitable manner such as by providing the sprocket disc 39 with facing bulges 45, illustrated in FIG. 4.

When the carrier 5 moves steadily towards the kiln 1, the situation of the cheeks 37 and sprocket disc 39 with respect to one another is that shown in FIG. 4 with the apertures 41, 43, fully registering. However, as soon as the motor 29 is de-energized in the manner aforesaid, the splined drive shaft 13 comes to a stop, causing the cheeks 37 likewise to come to a stop. In view of the momentum energy accumulated in the carrier 5 through the chains 25, 25', the central sprocket disc 39 tends, and in fact does, keep on rotating. This energy is then absorbed by the springs 21 which compress under the action of the momentum energy, as illustrated in FIG. 5.

I claim:

1. A metal melting installation comprising: a melting kiln formed with a crucible entrance opening, a movable carrier having a front end; a kiln door at the front end of said carrier, said door having an outer contour for application of said door over said entrance opening for closing said kiln; a crucible fixed to said door forwardly of said carrier front end so that said crucible lodges in said kiln when said door closes said entrance opening; drive means for moving said carrier relative to said kiln for applying said door over said opening, said drive means coomprising;

an electric control circuit including electric motor means having a drive shaft, said circuit further including a limit switch suitable to cut off said circuit when contacted, said limit switch being mounted on said kiln adjacent said entrance opening;

chain and sprocket means connected to said carrier for moving said carrier and including a drive sprocket wheel;

damper means interconnecting said drive shaft and said drive sprocket wheel for allowing said sprocket wheel to keep on rotating to dissipate accumulated momentum energy when said motorr is de-energized, and means on said carrier for contacting said limit switch and cutting off said circuit for de-energizing said motor when said door is fully applied over said entrance opening, wherein said chain and sprocket means comprise: a pair of endless movable sprocket chains extending on either side of said carrier and a pair of arms projecting laterally of said carrier and fixed to said chains to be driven thereby, and wherein said contacting means comprise a push button on one of said arms, said push button facing said limit switch.

2. An installation as claimed in claim 1, wherein one of said endless sprocket chains winds around said drive sprocket wheel.

3. An installation as claimed in claim 1, further comprising: a pair of rails parallel to said endless chains and wheels on said carrier riding on said rails.

4. An installation as claimed in claim 2, wherein said drive sprocket wheel comprises: a pair of spaced cheeks fixed to said drive shaft to be rotated thereby; a sprocket disc between said cheeks, freely mounted on said shaft and meshing with said one of said endless sprocket chains; wherein said cheeks and sprocket disc are formed with registering through apertures distributed evenly around said shaft, each aperture defining spaced walls facing one another, and wherein said damper means comprise coil springs mounted in said apertures with the ends thereof applied against said facing walls.

5. An installation as claimed in claim 4, further comprising: a pair of rails parallel to said endless chains and wheels on said carrier riding on said rails.

* * * * *